UNITED STATES PATENT OFFICE 2,592,377

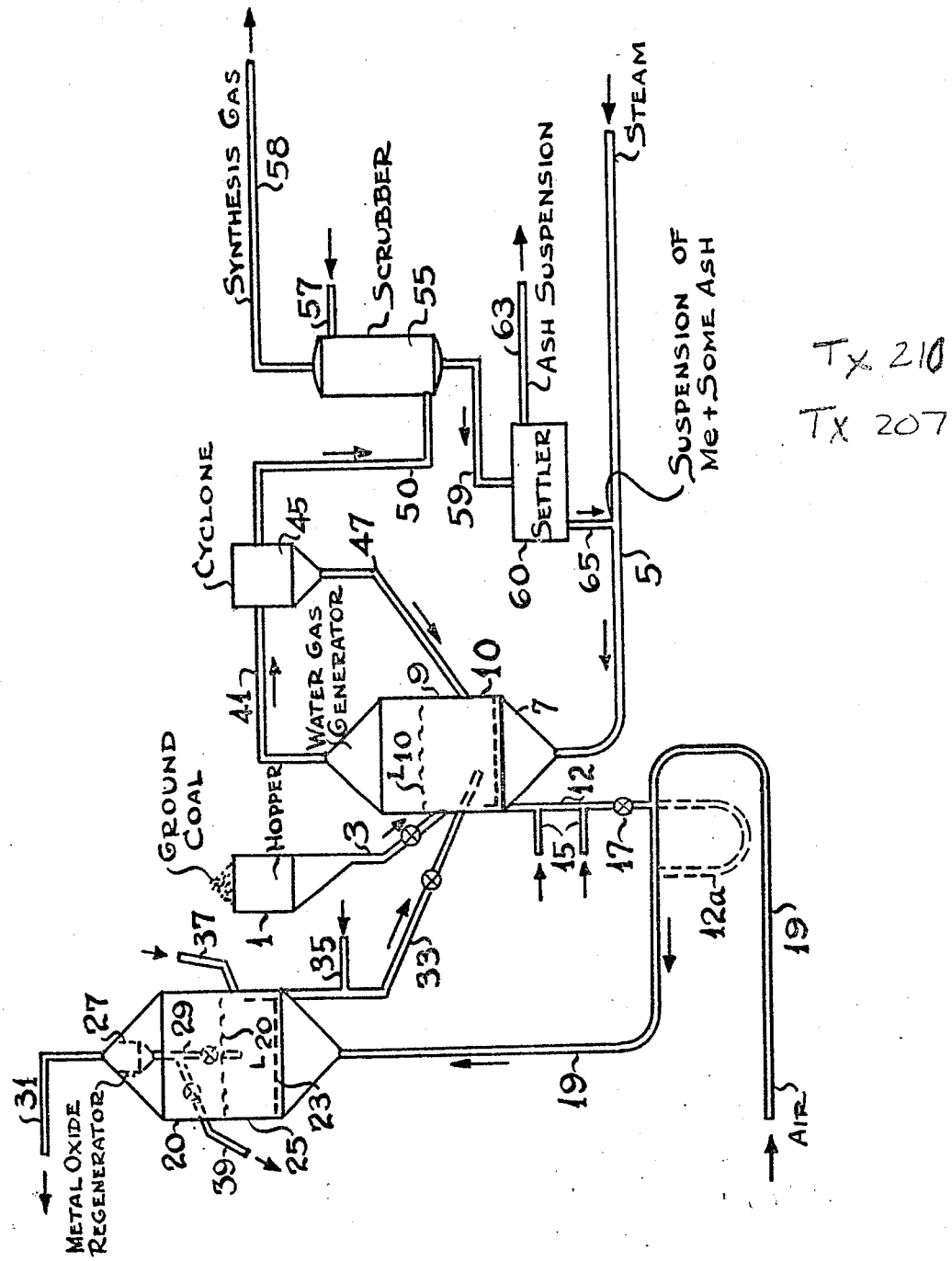

MANUFACTURE OF GAS MIXTURES CONTAINING CARBON MONOXIDE AND HYDROGEN

Frank T. Barr, Summit, and Homer Z. Martin, Roselle, N. J., assignors to Standard Oil Development Company, a corporation of Delaware Application August 8, 1946, Serial No. 689,156

14 Claims. (Cl. 48—206)

The present invention relates to the manufacture of gas mixtures containing carbon monoxide and hydrogen from non-volatile carbonaceous materials such as coal, coke, peat, oil shale, heavy oil residues, cellulosic materials, including lignin and the like, and more particularly to the manufacture of such gas mixtures as are suitable for the catalytic synthesis of hydrocarbons from carbon monoxide and hydrogen.

It has long been known that non-volatile carbonaceous materials such as coal, coke, and the like may be converted into water gas by a high temperature reaction with steam. The process yields mixtures of CO and $H_2$ in varying proportions, depending mainly on the conversion temperatures and the feed ratio of steam. The flexibility of the process may be illustrated by a series of possible chemical reactions about as follows:

$$C + 2H_2O \rightarrow 2H_2 + CO_2 - 24{,}700 \text{ cal.}$$

$$C + H_2O \rightarrow H_2 + CO - 32{,}500 \text{ cal.}$$

$$C + CO_2 \rightarrow 2CO - 40{,}200 \text{ cal.}$$

The overall water gas reaction being endothermic, heat must be supplied. This is usually accomplished by the combustion of a portion of the carbonaceous feed with an oxidizing gas, such as air and/or oxygen, at about 1600°–3000° F., in accordance with the following overall reactions:

$$C + O_2 \rightarrow CO_2 + 94{,}400 \text{ cal.}$$

$$2C + O_2 \rightarrow 2CO + 54{,}200 \text{ cal.}$$

The combustion reaction may be carried out either simultaneously with the water gas reaction or alternately in a make and blow fashion.

It will be appreciated from the above that the water gas process permits the production of gas mixtures of varying composition and B. t. u. content. Furthermore, the process as such is extremely well suited not only for the production of fuel gases but also for the production of feed gases for hydrogenation processes and particularly for the catalytic synthesis of hydrocarbons and/or oxygenated organic compounds from CO and $H_2$. Depending on the products desired, the latter synthesis requires $H_2$:CO ratios varying within the wide limits of 0.5–5 volumes of $H_2$ per volume of CO.

However, the technical utilization of the water gas process, particularly for hydrogenation processes and the production of synthesis feed gas, has been appreciably impeded by difficulties encountered in heat supply and continuous operation as well as in the substantial removal of sulfur compounds from the gas, the latter being imperative for the utilization of the gas in the hydrocarbon synthesis.

The problem of supplying heat of reaction with continuity of operation has been materially eased by the application of the so-called fluid solids technique wherein the carbonaceous charge is reacted in the form of a dense turbulent mass of finely-divided solids fluidized by the gaseous reactants and products. In this procedure heat is supplied to the gas generator by the combustion of carbonaceous constituents of the charge with air and/or oxygen either in the gas generator itself or in a separate heater from which it is transferred to the gas generator as sensible heat of hot combustion residue.

The procedure involving combustion within the gas generator requires the use of highly expensive pure oxygen as the oxidizing gas in order to prevent dilution of the product gas with nitrogen. When a separate heater is used, considerable loss of potential heat is incurred as a result of high carbon concentrations in the heater requiring greater quantities of air to provide the necessary heat for water gas generation at heater temperatures of about 1800°–2200° F. Moreover, the sensible heat of the combustion residue being the only heat source for the water gas reaction, the solids circulation rates from the heater to the gas generator are quite considerable, i. e. usually around 4 lbs. or 0.2 cu. ft. of solids per cu. ft. of water gas produced. In addition, it is necessary to operate the heater within a few pounds pressure, say 25, of the generator, thereby requiring compression of large amounts of air over a considerable pressure range if water gas of more than 25 lbs. pressure is to be produced. In any case, the water gas produced contains organic sulfur compounds which complicate considerably the gas desulfurization. Finally, the steam and cooling water requirements are relatively high. These difficulties result in a relatively high cost of water gas or synthesis gas from coal, averaging more than $.10 per 1,000 cu. ft. of gas produced as compared with about $.05 per 1,000 cu. ft. of synthesis gas produced by modern methane conversion processes.

The present invention overcomes the aforementioned difficulties and affords various additional advantages. These advantages, the nature of the invention and the manner in which it is carried out will be fully understood from the following description thereof read with reference to the accompanying drawing.

It is, therefore, the principal object of our invention to provide an improved process for the production of gas mixtures containing carbon monoxide and hydrogen from non-volatile carbonaceous materials.

Another object of our invention is to provide improved means for converting carbonaceous materials into gas mixtures suitable for the catalytic synthesis of hydrocarbons from carbon monoxide and hydrogen.

A more specific object of our invention is to provide improved means for supplying heat to a water gas generator using a carbonaceous charge in the form of a dense fluidized mass of finely divided solids.

Other and further objects will appear hereinafter.

In accordance with the present invention the gasification of solid carbonaceous materials with steam is carried out in the presence of metal oxides supplying the heat required. Employing the fluid solids technique the fluidized finely divided metal oxide is intimately contacted with, and gives off its oxygen to, the fluidized solid carbonaceous charge of the gas generator. The resulting combustion which may go in part to $CO_2$ may generate at least a substantial portion of the heat required by the water gas reaction. In addition, the metal oxide is reduced so that it may be reoxidized in an exothermic reaction to produce heat required by the gasification reaction. A substantial separation of solid gasification residue from reduced metal oxide is effected without appreciable heat losses and reduced metal oxide is continuously or intermittently circulated to a separate oxidation zone to be regenerated by oxidation with air at temperatures within the range of about 1400° to 2500° F. Regenerated metal oxide is returned to the gas generation zone substantially at the temperature of the oxidation zone thus supplying sensible heat of solids to the gas generation zone in addition to heat which may be generated by partial combustion within the gas generation zone.

In this manner, the volume of solids to be circulated through the system for the purpose of heat supply may be reduced in some instances to less than that required for the steam-carbon reaction when carried out in the absence of the metal oxides of the present invention. In addition air rather than pure oxygen may be used for heat generation. It should be noted that, as indicated above, in the system in which a separate heater is used and hot ashes from the heater supply the heat for the water gas reaction, the carbon concentration in the heater must be low in order to prevent excessive carbon monoxide formation therein. To accomplish this it has been necessary to operate the water gas generator likewise at a relatively low carbon concentration which results in a low rate of the water gas reaction. In accordance with our invention the necessity of low carbon concentration in a heater is obviated and the water gas generator may be operated at highest carbon concentrations and rates of reaction. Moreover, the metal oxide may act simultaneously as a cracking catalyst for organic sulfur compounds, thus simplifying the desulfurization of the product gas. In addition, it may catalyze the water gas shift reaction, thereby allowing the production of larger proportions of $H_2$ by reaction of CO with steam, the supply of the latter being controlled, if necessary, to establish concentrations suitable for high $H_2$ content at equilibrium, toward which the catalytic effect is directed. On the other hand, any methane formed by cracking of the carbonaceous feed is more easily reformed in the presence of metals such as iron, nickel, etc.

The metal oxides which may be used in the present process are quite generally such oxides as have such an affinity for oxygen at the temperatures of our process that their oxygen vapor pressures at equilibrium with both higher and lower stages of oxidation present are less than about 0.10 atmosphere and preferably less than 0.01 atmosphere so that substantially all the oxygen of the air used for regeneration can be bound by the lower stage of oxidation. The metal oxides should also be capable of oxidizing carbonaceous constituents of the solid carbonaceous charge at the temperatures and pressures of the water gas reaction. While certain oxides which are reduced to metals such as ferrous oxide, cuprous oxide, and the like, are useful for our process, other suitable oxides are the higher oxides of metals which are capable of forming both higher and lower oxides. Typical of these are cupric oxide, ferric oxide and vanadium pentoxide. Suitable also are mixtures of these oxides and mixtures with carrier materials such as kieselguhr, alumina or silica gels, bentonites, and the like.

As indicated above, spent metal oxide is concentrated in the solids withdrawn from the gas generation zone for regeneration. While this circulating material need not be free from ash introduced with the carbonaceous charge, it should be freed of significant concentrations of oxidizable material other than the spent metal oxide without incurring appreciable heat losses. For this purpose, the linear velocity of the gases in the gas generation zone may be so adjusted as to accomplish a desired separation of solids by elutriation. This method may be replaced or supplemented by packing the gas generation zone with relatively large sized non-fluidizable refractory aggregate such as ceramic tower packings, Raschig rings, or the like whereby a segregation or classification of the fluidized solids by density may be accomplished. Such segregation may be further enhanced by maintaining carbonaceous solids and metal oxide in different size distribution, the carbonaceous material having preferably a smaller size, and/or by using a metal oxide having a density significantly different from that of the carbonaceous solid.

In spite of the effective separation of ashes and carbonaceous solids from the metal mass accomplished in the gas generator by the above procedure, the metal mass withdrawn from the gas generator for regeneration in a separate oxidation zone frequently contains quantities of oxidizable carbonaceous matter which interfere with efficient operation of the oxidation zone. In order to eliminate these difficulties it is preferred to carry out the reoxidation of the metal mass in a fluidized oxidation zone packed with relatively large-sized non-fluidizable refractory aggregate such as the above mentioned ceramic tower packings and to adjust the superficial velocity of the fluidizing gas so as to remove overhead from the oxidation zone, ash and carbonaceous materials having a lower density than the metal mass while retaining the concentrated metal mass in the oxidation zone at oxidation conditions.

Having set forth the general nature and objects, our invention will be best understood from the more detailed description hereinafter, in which reference will be made to the accompanying drawing which shows a semi-diagrammatic view of apparatus suitable to practice a preferred embodiment of the invention.

Referring now in detail to the drawing the system illustrated therein essentially comprises a water gas generator 10, a metal oxide regenerator 20 and a separation system 45, 55, 60, the functions and cooperation of which will be presently explained. For the purpose of the following description, the carbonaceous charge will be referred to as coal and the metal oxide as iron oxide, but other materials may be used.

Coal ground to a fluidizable particle size, for example, of the order of 50% having a size of less than 100 mesh is fed, preferably continuously, from feed hopper 1 through line 3 which may have the form of an aerated standpipe, to water gas generator 10. Steam which, particularly during the starting period, may be preheated to temperatures of about 1200–1600° F., is supplied through line 5 to the bottom portion of generator 10 and passes through a distribution grid 7 into gas generation zone 9 to react with the coal at a temperature of between 1400° and 2400° F., preferably about 1600° to 1800° F. whereby water gas is formed. About 0.5 to 3.0 lbs. of steam per lb. of coal to be gasified is generally sufficient for this purpose, although if high CO gas is desired, steam addition may be dispensed with, except as required for fluidization, gasification being accomplished by the $CO_2$ and steam formed by oxidation of part of the coal.

Gas generation zone 9 also contains finely divided iron-oxide of a particle size slightly larger than that of the carbonaceous solids in the gas generator, e. g. a particle size of say about 50 mesh, which is supplied from metal oxide regenerator 20 as will appear more clearly hereinafter. The amounts of metal oxide required to supply the oxygen necessary to support the reaction in generator 10 vary between about 1 and 25 lbs., preferably about 2–10 lbs., per lb. of coal to be gasified, depending on the character of the coal or other carbonaceous solid used, the amount of inert material circulating, and the temperature desired in generator 10. However, this amount is preferably not less than that which gives up about 7–8 cu. ft. of oxygen (measured at standard conditions) per lb. of coal charged (on an ash and moisture-free basis). In addition to supplying oxygen to the gas generation zone, the circulating solid also acts to carry heat evolved in reoxidation zone 25 to the generation zone. The amount of heat so evolved will depend on the metal oxide used, but up to 500 lbs. of solids may be circulated per lb. of coal charged to accomplish this. A wide range of operable ratios of circulating solids to fresh coal addition, therefore, exists in operation of this process.

The linear velocity of the steam is so selected that the charge of gas generation zone 9 forms a dense ebullient mass of fluidized solids having a well defined upper level $L_{10}$ and that coal ash is carried overhead from generator 10, suspended in the product gases. Steam velocities of about 0.5–10 ft. per second, preferably 1–4 ft. per second are suitable for this purpose. At these conditions of particle sizes and gas flow, a crude classification of fluidized solids may be accomplished with the result that the solids charge of zone 9 gradually changes from a lower layer consisting substantially of reduced and unreduced iron oxide of high specific gravity to a middle layer consisting of a reacting mixture of coal and iron and iron oxides and an upper layer consisting mainly of coal undergoing gasification with steam. While there is no sharp separation between these layers, the classification is sufficiently pronounced to permit the withdrawal of substantially spent metal oxide containing minor proportions of carbonaceous material from the bottom of gasification zone 9 while at the same time allowing for sufficient contact between coal and iron oxide to produce by combustion heat required for the gasification reaction. If desired, this effect may be furthered by arranging a refractory tower packing of relatively large-diameter ceramic Raschig rings in zone 9.

As previously indicated, spent oxide is withdrawn from the bottom of zone 9 and passed downwardly through standpipe 12 aerated through taps 15 by small amounts of a suitable fluidizing gas such as air and/or flue gas and under some conditions, steam, and provided with a slide valve 17. This fluidizing gas may be added in sufficient quantities to strip the spent oxide of occluded water gas.

If desired, a reverse standpipe 12a such as disclosed in the copending application Serial No. 659,041, filed April 2, 1946 may be used in place of standpipe 12 to transport spent metal oxide from generator 10 to regenerator 25. This arrangement has the advantage that the spent metal oxide may be conveyed to regenerator 25 using low pressure air while, if desired, the generator may be kept under a high pressure when using a conventional standpipe of sufficient height for the feed of regenerated metal oxide from regenerator 25 to generator 10. This may be particularly desirable from an economic point of view when high-pressure synthesis gas is to be produced. It should also be noted in this connection that the use of metal oxide in place of ashes or other light inert heat carriers permits the use of standpipes of considerably reduced height for the purpose of establishing the desired pressures. The spent fluidized iron mass, if conveyed through a downflow standpipe, enters pipe 19 wherein it is picked up by air to form a dilute suspension which is passed under the pseudo-hydrostatic pressure of standpipe 12 to the lower portion of metal oxide regenerator 20 and through distributing grid 23 into oxidizing zone 25.

The linear velocity of the air supplied to regenerator 20 is so selected that a dense turbulent mass of fluidized solids having an upper level $L_{20}$ is formed above grid 23. Sufficient air must be charged to permit reoxidation of the iron mass at the rate prescribed by the heat requirement of gasification zone 9. In general, 40 to 130 cu. ft. of air per lb. of coal to be gasified is sufficient for this purpose.

The spent metal oxide mass supplied through line 19 may contain carbonaceous constituents resulting from an incomplete separation in gas generator 10. This carbonaceous material may be sufficient in amount to consume more oxygen than would be permissible for efficient operation of regenerator 20. We prefer, therefore, to provide reoxidizing zone 25 with a packing of large-sized non-fluidizable refractory Raschig rings while maintaining a superficial gas velocity of about 1–4 ft. per second as described in connection with gas generator 10. In this manner, we accomplish a substantial concentration of metal oxide in zone 25 and elutriation of any material of lower specific gravity including the carbonaceous constituents.

The oxidation temperature in zone 25 is maintained between 1500° and 2500° F., preferably at about 1700°–1900° F. by a proper control of the air supply. Residual air consisting essentially of nitrogen and small proportions of $CO_2$ is withdrawn overhead through a conventional gas-solids separator 27 provided with solids return pipe 29, and through line 31 to be either vented or passed to any desired use such as aeration of standpipe 12 or nitrogen recovery. If desired, cyclone separator 27 may be located downstream of means for cooling the flue gases. Separator 27 is preferably operated so as to return to zone 25 only metal oxide entrained in the residual air.

Regenerated oxidized iron is withdrawn downwardly from regenerator 20 and passed substantially at the temperature of zone 25 through a standpipe 33, aerated and stripped with steam through taps 35, into gas generation zone 9 of generator 10. The rate of metal oxide circulation through pipe 33 may vary within wide limits depending on the metal oxide and carbonaceous solid used and the desired temperature gradient between zones 9 and 25. It should, however, be sufficient to make about 0.01 to 0.5 mol of $O_2$ available in zone 9 per lb. of carbon to be gasified. In the case of iron oxide and a common bituminous coal the solids circulation through pipe 33 may be about 1 to 25 lbs., preferably about 5–10 lbs. or 0.02–0.07 cu. ft. per cu. ft. of water gas produced.

Fresh metal oxide may be supplied to regenerator 20 through line 37 and metal oxide fines of undesirably small size may be withdrawn from the system through line 39.

Returning now to gas generator 10, product gas consisting essentially of CO and $H_2$ and small amounts not exceeding about 5–15% of $CO_2$ and containing entrained coal ash together with a small amount of unconverted coal and iron or iron oxide is withdrawn through line 41 and passed to a conventional gas-solids separator 45, preferably of the centrifugal type, wherein a major proportion of the heaviest entrained solids, particularly metal and metal oxide, is separated and returned through line 47 to gas generator 10. The gas containing the remtaining entrained solids passes through line 50 to a water scrubber 55 wherein it is completely freed of solids by water supplied through line 57 for countercurrent flow. Product gas is withdrawn overhead from scrubber 55 and passed through line 58 to conventional gas purification equipment (not shown) and ultimately to a synthesis reactor or other use.

Water containing coal ash and minor amounts of metal or metal oxide and unreacted coal is withdrawn from the bottom of scrubber 55 through line 59 and passed to a settling zone 60 wherein a further crude classification of the suspended solids by density takes place. A suspension enriched in coal ash may be decanted and removed from settler 60 through line 63. The lower layers of settler 60 contain a suspension enriched in metal or metal oxide and some carbonaceous material which may be withdrawn through line 65 and passed into steam feed line 5 to be returned to generator 10.

If desired, tail gas from the hydrocarbon synthesis may be recycled to generator 10, for example, via steam feed line 5 in order to modify the composition of the water gas produced by the conversion of the gaseous hydrocarbons and $CO_2$ contained in the tail gas.

While no specific pressures have been mentioned above it should be understood that pressures varying from slightly sub-atmospheric to about 400 lbs. per sq. in. gauge may be applied. If high B. t. u. fuel gas of increased methane content is desired, pressures of at least 200 lbs. per sq. in. are preferred. A particular advantage of the invention resides in the fact that synthesis gas may be produced in generator 10 at any desired elevated pressure while reoxidizer 20 may be operated at substantially atmospheric pressure, thus saving the cost of compressing large volumes of air to high pressures.

It will be appreciated from the above description that the system illustrated in the drawing permits a fully continuous conversion of carbonaceous solids into a mixture of carbon monoxide and hydrogen of improved purity, affords optimum heat economy and requires a minimum of solids circulation. While we have shown preferred means for recovering metal oxide suspended in the product gas or admixed with other solids, we do not wish to be limited to these specific means. Numerous variations and modifications thereof may appear to those skilled in the art without departing from the spirit of our invention.

Our invention will be further illustrated by the following specific example.

*Example*

For the production of 415 million cu. ft. of synthesis gas per day containing 175 million cu. ft. of $H_2$, 175 million cu. ft. of CO, and 65 million cu. ft. of $CO_2$ from a coal containing 4.2 lbs. of $H_2$ per 100 lbs. of carbon using iron oxide as the oxygen carrier, the following operating conditions have been found to be suitable.

Coal feed, 188 tons per hour.
Process steam feed, 440,000 lbs. per hour.
Air feed to regenerator, 315,000 SCF per minute.
Solids circulated from regenator to generator, 1,200 tons per minute.
Generator temperature, 1800° F.
Generator pressure, 100 lbs./sq. in. gauge.
Regenerator temperature, 1900° F.
Regenerator pressure, 1 lb./sq. in. gauge.
Approximate height of standpipe from regenerator to generator, 100 ft.
Preheating temperature of steam and air, 1100° F.

While the foregoing description and exemplary operations have served to illustrate specific applications and results of our invention, other modifications obvious to those skilled in the art are within the scope of our invention. Only such limitation should be imposed on our invention as are indicated in the appended claims.

We claim:

1. The process of producing carbon monoxide and hydrogen which comprises passing steam upwardly through a dense fluidized bed of finely divided carbonaceous solids of fluidizable particle size maintained in a gasification zone at gasification conditions of temperature and pressure in the presence of fluidizable particles of a metal oxide which oxidizes carbonaceous materials at the gasification conditions and which has a lower buoyancy in gas than that of the solid gasification residue of said carbonaceous solids, said metal oxide being added in amounts and at a temperature sufficient to supply at least a substantial portion of the heat required to maintain said gasification temperature, withdrawing a gas containing carbon monoxide and hydrogen upwardly from said bed, passing the steam upwardly through the dense fluidized bed at a velocity such that metal oxide particles of reduced oxygen content are concentrated in the lower portion thereof to a relatively greater extent than in the upper portions of said fluidized bed, withdrawing a stream of solids from the lower portion of the fluidized bed, passing said stream to a dense fluidized bed of finely divided metal oxide, passing air upwardly through said second named bed at conditions adapted to reoxidize said withdrawn metal oxide by an exothermic reoxidation reaction, and returning reoxidized metal oxide from said second named bed to said first named bed.

2. The process as claimed in claim 1 wherein the average particle size of said metal oxide is larger than that of said carbonaceous solids in said first named bed.

3. The process as claimed in claim 1 wherein said first named bed contains a packing of refractory materials of greater than fluidizable particle size.

4. The process as claimed in claim 1 wherein the linear velocity of said steam is so controlled that at least a major proportion of ash of the carbonaceous solids is entrained in said withdrawn gas.

5. The process as claimed in claim 1 wherein metal oxide entrained in said withdrawn gas is recovered outside said gasification zone and returned to said first named bed.

6. The process as claimed in claim 1 wherein said second named bed contains a packing of refractory materials of greater than fluidizable particle size and the linear velocity of said air within said bed is so controlled that solids of higher buoyancy in gas than that of said metal oxide are carried overhead from said second named bed.

7. The process as claimed in claim 1 wherein the pressure of said gasification zone is substantially higher than the pressure on said second named bed.

8. The process as claimed in claim 1 wherein tail gas from a hydrocarbon synthesis reaction is recycled to said first named bed.

9. The process as claimed in claim 1 wherein said withdrawn gas contains a major proportion of ash and smaller proportions of reduced metal oxide and carbonaceous solids, said gas is subjected to a mechanical gas solids separation to separate reduced metal oxide from said withdrawn gas, said withdrawn gas is passed thereafter through a scrubbing and settling system to separate further reduced metal oxide and carbonaceous solids from ash, and the separated reduced metal oxide and carbonaceous solids are returned to said first named bed.

10. The process as claimed in claim 1 wherein the pressure of said gasification zone is at least 200 lbs. per sq. in. and the pressure on said second named bed is substantially atmospheric.

11. The process as claimed in claim 1 wherein the pressure of said gasification zone is substantially higher than the pressure on said second named bed and said withdrawn metal oxide is passed to said second named bed by means of a standpipe in which said withdrawn metal oxide flows upwardly in the fluidized state under the influence of said higher pressure.

12. The process as claimed in claim 1 wherein at least a portion of said heat is supplied as exothermic heat generated by said oxidation reaction.

13. The process of claim 1 wherein at least a portion of said heat is supplied as sensible heat of said reoxidized metal oxide highly heated in said second named bed by said reoxidation reaction.

14. The process of claim 1 wherein said gasification zone is operated at a pressure within the range of from slightly below atmospheric to about 400 p. s. i. g.

FRANK T. BARR.
HOMER Z. MARTIN.

REFERENCES CITED

The following references are of record in the file of this patent:

UNITED STATES PATENTS

| Number | Name | Date |
|---|---|---|
| 1,857,799 | Winkler | May 10, 1932 |
| 2,425,754 | Murphree et al. | Aug. 19, 1947 |
| 2,436,938 | Scharmann et al. | Mar. 2, 1948 |
| 2,482,187 | Johnson | Sept. 20, 1949 |

FOREIGN PATENTS

| Number | Country | Date |
|---|---|---|
| 8,239 of 1899 | Great Britain | Mar. 10, 1900 |

OTHER REFERENCES

Getman et al., "Outlines of Theoretical Chemistry," 5th edition, pgs. 250 and 251.